United States Patent
Lu

(10) Patent No.: US 10,995,221 B2
(45) Date of Patent: May 4, 2021

(54) FIRE RETARDANT-TREATED WOOD PRODUCTS WITH DURABLE COATING PROTECTION

(71) Applicant: Ziqiang Lu, Red Wing, MN (US)

(72) Inventor: Ziqiang Lu, Red Wing, MN (US)

( * ) Notice: Subject to any disclaimer, the term of this patent is extended or adjusted under 35 U.S.C. 154(b) by 41 days.

(21) Appl. No.: 15/664,471

(22) Filed: Jul. 31, 2017

(65) Prior Publication Data

US 2018/0037751 A1 Feb. 8, 2018

Related U.S. Application Data

(60) Provisional application No. 62/494,272, filed on Aug. 3, 2016.

(51) Int. Cl.
| | |
|---|---|
| *C09D 5/18* | (2006.01) |
| *C09J 131/04* | (2006.01) |
| *C09D 131/04* | (2006.01) |

(52) U.S. Cl.
CPC ............. *C09D 5/18* (2013.01); *C09D 5/185* (2013.01); *C09D 131/04* (2013.01); *C09J 131/04* (2013.01)

(58) Field of Classification Search
CPC ........................................................ C09D 5/18
See application file for complete search history.

(56) References Cited

U.S. PATENT DOCUMENTS

| | | | | |
|---|---|---|---|---|
| 2007/0020476 A1* | 1/2007 | Kintzley | ................ | B27N 3/002 428/537.1 |
| 2016/0115337 A1* | 4/2016 | Lu | ............................ | C08K 3/04 428/424.4 |

* cited by examiner

*Primary Examiner* — Arrie L Reuther
(74) *Attorney, Agent, or Firm* — Vidas Arrett & Steinkraus P.A.

(57) ABSTRACT

A novel method of improving the water and leaching resistances and durability of a fire retardant-treated wood product by using a chemical fire retardant composition in which crosslinking polyvinyl acetate (XPAVc or X-PVAc) is applied as a protective coating on wood over the fire retardant layer. An additional crosslinking polyvinyl acetate coating layer or one or more layers of acrylic, alkyd, epoxy, lacquer, polyester, polyurethane, silicone coatings, vinyl ester, or the like may further cover the cured crosslinking polyvinyl acetate primer and then dried or cured.

11 Claims, No Drawings

FIRE RETARDANT-TREATED WOOD PRODUCTS WITH DURABLE COATING PROTECTION

CROSS-REFERENCE TO RELATED APPLICATIONS

This application is a utility application claiming priority to provisional application No. U.S. 62/494,272 filed on Aug. 3, 2016, the disclosure and entire contents of which are incorporated herein by reference.

FEDERALLY SPONSORED RESEARCH

None.

SEQUENCE LISTING

None.

TECHNICAL FIELD

The invention relates to a novel method of improving the water and leaching resistances and durability of fire retardant-treated wood products in a natural environment.

BACKGROUND OF THE INVENTION

Wood is a natural engineering material and has been extensively used as a building material for human beings. However, wood is also a dangerous material because it is combustible by fire and can be spontaneously ignitable at high temperatures. When wood is treated with a fire or flame retardant, the resultant wood products are resistant to fire by slowing down the combustion speed, controlling the fire spreading, or reducing the flammability of wood. A fire retardant-treated wood material can delay the combustion of wood, but it is not fireproof. Moreover, it may not be water resistant and may be subject to the attack of fungi, molds or mildews, insects, or the like.

Since most of the fire retardant-treated wood products are hygroscopic, they absorb water and even water moisture during service. The absorbed water in the lumens of vessel elements and fiber tracheids or other microstructure cavities of the fire retardant-treated wood and wood composites may move freely by capillary action in a natural atmosphere and cause the swelling and shrinking of wood. The swelling and shrinking stress may result in cracks and splits of wood. The fire retardant-treated wood and wood composites may gradually accumulate so many cracks and splits that they cannot maintain the required strength properties. In addition, some fire retardant-treated wood products may be rotted down into the center part due to the opening up of the cracks deeply into wood. Furthermore, the fire retardants mostly used in the market are acidic. Hence, the modulus of elasticity, modulus of rupture, and impact resistance of a fire retardant-treated wood product may be significantly decreased by the acidic hydrolysis of wood in the natural environment.

Another defect of the fire retardant-treated wood products is the leaching out of a fire retardant from wood during service. When a fire retardant-treated wood product is wet, the fire retardant gradually decreases in retention, depending on the fire retardant type, wood species, and the end use. Therefore, the fire retardant-treated wood product would reduce and even lose its fire resistance. Moreover, the leachates of the fire retardant may be harmful to human beings, livestock, wildlife, and the natural environment. On the other hand, the fire retardants mostly used in the market are corrosive to metal materials. The corrosiveness would be worse under a wet condition during service.

In order to improve their water resistance, some fire retardant-treated wood products are coated with regular wood coatings or paints such as lacquer, latex, and the like. However, they cannot maintain a good water resistance for the fire retardant-treated wood products because these coatings either peel off for a time or cannot prevent wood from cracking during outdoor exposure or at a frequently wet place.

SUMMARY OF THE INVENTION

The present disclosure describes the chemical compositions, materials, coating layers and structures, manufacturing methods, and use alternatives for a fire or flame retardant-treated wood product or member. Unlike a regular fire retardant-treated wood material, a novel chemical fire retardant composition is applied for wood and consists of at least two coating layers. The first coating layer is a fire retardant chemical applied on or in wood and then dried, while a crosslinking polyvinyl acetate adhesive (XPVAc or x-PVAc) acts as a protective coating over the fire retardant to further seal at least one portion of exterior surfaces of the fire retardant-treated wood product and is then cured. An additional layer of XPVAc may be further applied as a top or exterior layer. Alternatively, only one layer of XPVAc is used to cover a fire retardant-treated wood product which is inside a building or used indoors. Alternatively, a wood coating like acrylic, alkyd, epoxy, lacquer, polyester, polyurethane, silicone coatings, and vinyl ester is applied over the cured XPVAc primer. Alternatively, multiple layers of the above wood coating may be applied on the cured XPVAc primer. Hence, the fire retardant is tightly sealed in wood and prevented from leaching out by water, vapor, mist or moisture condensation, or in other wet conditions to avoid losing its fire retarding efficiency. Moreover, the introduction of the protective coating of XPVAc provides an excellent water resistance to wood, thereby improving the durability and service life of a fire retardant treated wood material in a natural environment.

A fire retardant-treated wood product may be a fire retardant-treated solid wood or wood composite material, including fire retardant-treated wood poles, logs, plywood, particleboards, flakeboards, oriented strand boards (OSB), hardboards, medium density fiberboards (MDF), laminated veneer lumber (LVL), laminated strand lumber (LSL), parallel strand laminates (PSL), paper products, cardboards, cotton, cellulose, sisal, kenaf, jute, or other natural fibers-based composites, or other wood-based or inorganic bonded panels or planks such as gypsum particleboards, slag particleboards, cement particleboards, etc.

When the substrate of a fire retardant-treated wood product is a wood composite material made from the composition elements of chips, fibers, flakes, lumber, particles, strands, sawdust, veneer, wood flour, or the like, the composite may have different glueline structures. Before assembly, the aforementioned composition elements are normally coated or mixed with a wood adhesive. The wood adhesive may be urea formaldehyde (UF), melamine formaldehyde (MF), melamine urea formaldehyde (MUF), phenol formaldehyde (PF), crosslinking polyvinyl acetate (XPVAc), resorcinol formaldehyde (RF), emulsion polymer isocyanate (EPI), resorcinol phenol formaldehyde (RPF), polyurethane, polymeric diphenylmethane diisocyanate (pMDI), soy protein-based glues, etc. The above coated wood composition elements are then assembled into a panel mat. The assembly is finally formed into a wood composite under a hot or cold press or a similar facility.

After fabrication, the formed gluelines or bondlines of a wood composite substrate may be substantially continuous or substantially discontinuous, depending on the product designs and applications. The gluelines of the substrate are preferred to be substantially parallel to the composite panel surfaces, while the gluelines can be substantially vertical to the composite panel surfaces. Alternatively, a wood composite material can have a combined glueline structure in which the first glueline substantially parallels to the top and bottom panel surfaces, while the second one is substantially vertical or perpendicular to the top and bottom panel surfaces, and thus both gluelines can coexist in the same wood composite.

For the invention, a fire retardant may be a zinc (Zn)-, magnesium (Mg)-, or aluminum (Al)-based compound or complex, a boron (B)-, phosphorus (P)-, bromine (Br)-, sulfur (S)-, nitrogen (N)-, chlorine (Cl)-, fluorine (F)-, or silicon (Si)-based compound or complex, or the combination thereof. The fire retardant may be a water-based or water insoluble chemical. In general, a fire retardant-treated wood product has a minimum fire retardant retention of 0.005 lbs./ft$^3$, while the concentration of the active fire retardant is larger than 0.1% of a fire retardant formula by weight.

A water-based fire retardant is selected from the group of a waterborne fire retardant, a water-dispersible fire retardant, or the combination thereof. For instance, a waterborne fire retardant may be a metal salt or compound. For the invention, the fire retardant may be applied in or on wood by pressure impregnation, or by dipping, soaking, brushing and the like under an atmospheric pressure. Although some fire retardants are water-unsolvable or oil-based chemicals, they can be converted into a water dispersible or emulsion system by using water dispersible co-solvents, cationic or anionic emulsifiers, alcohols, glycols, esters, and other dispersing agents. Alternatively, the water-insoluble fire retardant can be added into a water-based adhesive like PF, MF, MUF or UF to form a water-based fire retardant coating for wood.

Alternatively, a water-insoluble fire retardant can be directly used as powder, pellets, or the like for a wood composite material. Preferably, the water-insoluble fire retardant is applied or mixed with the wood composition elements during the manufacturing or fabrication of a wood composite substrate.

For the invention, XPVAc is not only an adhesive to wood when applied over the fire retardant layer and cured, but it also acts as a protective coating for wood. XPVAc at least consists of a polyvinyl acetate-based adhesive resin, a cross-linking agent, and a catalyst before being cured. In addition, XPVAc can be a Type I or Type II adhesive, depending on the applications of the resultant protected and fire retardant-treated wood material. Moreover, the XPVAc coating can be a primer or a top coat of wood. More importantly, the XPVAc coating can also chelate with the active ingredients of a fire retardant and thus is helpful to fix and keep them in wood. The XPVAc coating has a minimum solid content of about 20% by weight, and is between about 0.001 to about 0.010 inch in dry thickness after coated and cured on wood.

During service, the XPVAc protective coating is recommended to be a Type II adhesive and at least about 175 psi in Fruehauf wet shear strength when a fire retardant-treated wood product is applied in a building, while the XPVAc coating used as a primer for the fire retardant-treated wood product is required to be a Type I adhesive and at least about 325 psi in Fruehauf wet shear strength when it is used in an indoor and wet or high humidity condition or under a semi-outdoor environment where the fire retardant-treated wood material is partially shielded. The XPVAc primer can be further coated with one or more layers of a wood coating including acrylic, alkyd, epoxy, lacquer, polyester, polyurethane, and the like. However, XPVAc should have a minimum Fruehauf wet shear strength of about 525 psi when it is cured and directly applied as a top or exterior coat of the fire retardant-treated wood product for outdoor exposure. Alternatively, an XPAVc-coated and fire retardant-treated wood product in which a Type I XPVAc adhesive is at least about 525 psi in Fruehauf wet shear strength can also be used in an indoor and wet or high humidity place. Accordingly, using the above coating compositions and structures results in a durable, water and leaching resistant fire retardant-treated wood product.

DETAILED DESCRIPTION OF THE INVENTION

Although a fire retardant-treated wood member is not fireproof, the fire retardant can delay or slow down the burning of a wood member when the wood is exposed to an open fire. Generally, the fire retardant may be a water-based or a water-insoluble chemical. For the invention, a water-based fire retardant may be selected from the group consisting of a waterborne fire retardant, a water-dispersible fire retardant, or the combination thereof, while an insoluble fire retardant can be used as powder for the wood member.

For the invention, a fire retardant is also called a chemical fire retardant or a fire retardant chemical. The fire retardant formula used for treating a wood member or product is known as a fire retardant composition, a chemical fire retardant composition, or a fire retardant chemical composition. Collectively, the term of "a fire retardant-treated wood member", "a fire retardant-treated member", "a chemical fire retardant-treated wood member" or "a chemical fire retardant-treated member" is herein referred to as all fire retardant-treated wood products.

The fire retardant-treated wood product can be manufactured through most of the prior art processes known by one of ordinary skill in which a wood material is treated with a fire retardant through dipping, soaking, brushing, spraying, etc. Alternatively, a wood material can be pressure-treated with a waterborne fire retardant through an impregnating process, including the full-cell, empty-cell, modified full-cell, fluctuation pressure processes, high pressure sap displacement system, and the like, which may be derived or modified from the Bethell, Reuping, or Lowry process. All the above treating processes are suitable for the fire retardant-treated wood products for the invention.

For the invention, the wood member used for the fire retardant treatment may be a solid wood material or a wood composite or engineered wood product. For instance, the wood member can be lumber, timbers, logs or poles, plywood, fiberboards, OSB, flakeboards, MDF, particleboards, LVL, LSL, PSL, oriented strand lumber (OSL), cross laminated timber (CLT), and the like. Moreover, it can also be made from natural fiber-based composites, including bamboo, sisal, kenaf, hemp, jute, flax, cornstalk, bagasse fiber, cotton, cellulose or other nature fibers-based composites, paper products, cardboards, gypsum particleboards, cement particleboards, etc.

When the substrate of a fire retardant-treated wood product is made from a wood composite material, its composition elements such as chips, fibers, flakes, lumbers, sawdust, strands, veneer, wood flour, etc. are normally coated by or mixed with a wood adhesive. The wood adhesive may be UF, MF, MUF, PF, RF, RPF, polyurethane, EPI, pMDI, soy protein-based glues, and the like. In general, the glueline of an adhesive in a wood composite is between about 0.001 inches to about 0.010 inches, or about 0.003 inches to about 0.004 inches, or about 0.007 inches to 0.008 inches in dry thickness.

For the invention, the glueline or bondline of an adhesive is normally substantially parallel to the panel surfaces, and it can be substantially continuous or discontinuous. For example, the gluelines of plywood, LVL, etc. substantially parallel to the panel surfaces are substantially continuous, while the gluelines of OSB, particleboards, fiberboards, LSL, PSL, OSL, etc. are substantially discontinuous or intermittent on individual composition elements although the gluelines are substantially parallel to the panel surfaces. During service, it is a common practice that the gluelines of a wood composite should be substantially parallel to the panel surfaces. In such a way, the majority of the gluelines of the wood materials are covered by wood to avoid any weathering or aging issues caused by direct exposure to sunlight, UV light, rain, snow, vapor, and other environmental factors.

In some situations, the gluelines of a wood composite can be substantially vertical or perpendicular to the panel surfaces. All gluelines substantially vertical to the panel surfaces expose on the top and bottom surfaces, while those substantially parallel to the panel surfaces do not appear on the top and bottom surfaces of a wood composite which are much larger in area than the ends and edges. Moreover, the top or bottom surfaces of a wood composite usually faces up or outside during application. The gluelines substantially vertical to the panel surfaces may be subject to huge stress due to the moisture content and dimensional and shape changes during service compared with those substantially parallel to the panel surfaces. There is a tendency that all gluelines substantially vertical to the panel surfaces would be delaminated along the glueline direction by weathering or aging under the natural environment. Hence, a wood composite with gluelines substantially vertical to the panel surfaces is not durable when used outdoors or in contact with water but needs to be used indoors or protected within a closed structure.

Alternatively, an engineered wood product like CLT contains gluelines both substantially parallel and substantially vertical to the panel surfaces. A wood composite with such a hybrid glueline structure is more durable than that only with gluelines substantially vertical to the panel surfaces because the gluelines in both directions help keep all composition elements of the composite together as one unit in the natural environment.

According to the inventor's experiment, a fire retardant-treated wood product with the substantially vertical glueline structure can be used for outdoor applications only when the thickness ratio of its dry wood composition element such as veneer or lumber to the dry glueline of a wood adhesive such as MUF or PF is less than 300. Of course, the fire retardant-treated wood product with such a glueline feature must be sealed with the XPVAc primer and the additional coating layer of a wood coating like acrylic or alkyd when it is exposed to an outdoor environment or frequently wetted by water.

In some situations, a wood composite material may be treated with a fire retardant before or after its manufacturing process. For example, the wood composite can be directly treated with a water-based fire retardant through the aforementioned process of soaking, spraying, dipping, brushing, pressure-impregnating, or the like. In another example, an insoluble fire retardant can be added into an adhesive such as UF, MF, MUF or PF to form a coating material. The resultant fire retardant coating is then applied on wood.

Alternatively, the composition elements of a wood composite, including chips, fibers, flakes, lumbers, sawdust, strands, veneer, etc., can be pressure-treated with a waterborne fire retardant before the manufacturing process. The treated composition elements then pass through the processes of drying, glue-applying, and assembling, and are finally formed into a fire retardant treated-wood composite under a cold or hot press. Since the waterborne fire retardant can penetrate deeply into individual composition elements through such a pretreatment, the resultant fire retardant-treated wood product is better in fire resistance than a fire retardant-treated wood product by the post fire retardant treatment.

In some other situations, a fire retardant, especially, a water-insoluble fire retardant can be mixed as powder with the wood composition elements such as particles, flakes, chips, fibers, etc. The resultant blend is sprayed with a wood adhesive and further passes through a forming process. The assembly is then formed into a wood composite under a cold or hot press.

For the invention, a fire retardant for wood may consist of zinc (Zn)-, magnesium (Mg)-, aluminum (Al)-, or other metal-based salts or compounds, or boron (B)-, phosphorus (P)-, nitrogen (N)-, bromine (Br)-, silicon (Si)-, chlorine (Cl)-, fluorine (F)-, or iodine (I)-based compounds, or the combination thereof.

A water-based fire retardant is selected from the group of a waterborne fire retardant, a water-dispersible fire retardant, or the combination thereof. In general, a waterborne fire retardant is a metal-based salt or compound.

In at least some situations, a waterborne fire retardant may include ammonium bromide, ammonium chloride, antimony trioxide, antimony pentoxide, sodium antimonate, sodium chloride, potassium chloride, ammonium sulfate, boric acid, glucose-diammonium phosphate, magnesium carbonate, magnesium chloride, magnesium hydroxide, magnesium oxide, melamine phosphate, monoammonium phosphate, diammonium phosphate, polyphosphatic carbamate, potassium bromide, potassium sulfate, sodium borates including borax decahydrate and disodium octaborate tetrahydrate (DOT), sodium silicate, zinc bromide, zinc chloride, zinc oxide, zinc sulfate, and the combination thereof. These are just examples.

Normally, water is the primary solvent of a waterborne fire retardant, while some water-unsolvable or oil-based fire retardants can be converted into a water dispersible or emulsion system by using water dispersible co-solvents, cationic or anionic emulsifiers, alcohols, glycols, esters, other dispersing agents and even wood adhesives.

Although a nitrogen-based compound including ammonium and amine can be a composition ingredient of phosphorus-, boron-, and silicon-based fire retardants, they do not act as an active fire retardant ingredient. On the other hand, both antimony oxide and sodium antimonite are not a very effective fire retardant. Most often, they need to be applied as a fire retardant synergist which is normally combined with halogenated fire retardants.

In some cases, a fire retardant may be an organohalogen compound. The organohalogen fire retardant may be chlorendic acid derivatives, decabromodiphenyl ether, decabromodiphenyl ethane, polybrominated diphenyl ethers (PBDEs), brominated polystyrenes, brominated carbonate oligomers (BCOs), brominated epoxy oligomers (BEOs), tetrabromophthalic anhydride, tetrabromobisphenol A (TBBPA), hexabromocyclodo-decane (HBCD), etc. These are just examples.

In some other cases, a fire retardant may be an organo-phosphorus compound, including triphenyl phosphate (TPP), resorcinol bis(diphenyl phosphate) (RDP), bisphenol A diphenyl phosphate (BADP), tricresyl phosphate (TCP), tris(2-butoxyethyl)phosphate (TBEP), tris(2-chloroethyl)phosphate (TCEP), dimethyl methyl-phosphonate (DMMP), tris(2,3-dibromopropyl)phosphate (TBPP), tris(2-chloro-isopropyl)phosphate (TCPP), tris(2-ethylhexyl)phosphate (TEHP), tris(1,3-dichloro-2-propyl)phosphate (TDCPP), tetrakis(hydroxylmethyl)phosphonium chloride (THPC), tetrakis(2-chloroethyl)dichloroisopentyldiphosphate (V6), dicyandiamide-phosphoric acid-formaldehyde, guanylurea phosphate (GUP), organophosphate esters (e.g., oligomeric phosphonate, diethyl bis(2-hydroxyethyl)aminomethylphos-phonate, etc. These are just examples.

For the invention, a fire retardant can be an organosilicon compound, including vinyl trimethoxy silane, 3-aminopro-pyl triethoxy silane, tri(acryloyloxyethyloxy)phenyl silane, triglycidyloxy phenyl silane (TGPS), N-maleimido phenoxy silane, 3-isocyanatopropyl triethoxysilane, polyvinyl silses-quioxane, etc. These are just examples.

Most of the above organohalogen, organophosphorus, and organosilicon fire retardants are usually water-insoluble, but they can be emulsified as a water solution or converted into a water-based chemical.

Although some fire retardants are hardly soluble or insoluble in water, they can be used as powder or pellet in a fire retardant-treated wood product. The water-insoluble fire retardants include zinc borate, anhydrous borax, alumi-num trihydroxide, huntite, hydromagnesite, silica such as precipitated silica, pyrogenic silica, phonolite, and the like. For example, an insoluble fire retardant can be added into a wood adhesive to form a fire retardant coating. The resultant coating can be applied on at least one portion of the exterior surfaces of a wood product for fire protection after being cured.

The aforementioned fire retardants can be divided into mineral additive and reactive groups. The first group are normally metal salts or compounds, including aluminum hydroxide, potassium bromide, potassium chloride, zinc chloride, zinc oxide, sodium chloride, and the like. More-over, most of the fire retardants in this group are intumes-cent. The reactive fire retardants may be organohalogen, organophosphorus, and organosilicon compounds, including GUP, RDP, 3-isocyanatopropyltriethoxysilane, some organophosphate esters, etc. They can react with wood and are chemically attached on wood without losing their fire retardant efficiency, but some of them may not be perma-nently bonded with wood.

In at least some cases, other boron-based fire retardants may include barium metaborate, ammonium fluoroborate, phospho-ammonium-boron complex, etc.

In general, a chemical fire retardant for wood is different in function from a chemical preservative for wood preser-vation. Firstly, most of the fire retardant chemicals cannot be effectively used for wood preservation. For instance, most zinc-based fire retardants such as zinc chloride and zinc oxide are effective in fire resistance and also resistant to the attack of some insects or bacterial. However, they are not toxic enough to most of wood decay fungi or mildews. In addition, diammonium phosphate is an excellent fire retar-dant for wood, but it is not a wood preservative at all. On the other hand, copper sulfate is a wood preservative, while it is usually not used as a fire retardant. Secondly, some water-borne fire retardants may be effective to kill some mildew and fungi when used for wood. However, they are easily leached out and less powerful to prevent wood from the attack of mildew and fungi at low concentration. For instance, boric acid is registered as a commercial fire retar-dant, while it can be only temporarily used as a preservative to prevent wood lumbers from the attack of insects or mildews before and during long distance shipping or during short time storage of lumber before kiln drying. Moreover, most of the current fire retardants are normally used indoors or in a dry condition, while most of the wood preservatives need to be applied either outdoors or in a frequently wet situation. Hence, a fire retardant cannot be used as a wood preservative in most situations and applications.

For a fire retardant-treated wood product, the concentra-tion of the fire retardant must be larger than 0.005 lbs. per cubic foot. For a better resistance to fire, the active fire retardant in wood is required to be at least 0.1% of a fire retardant formula by weight.

After the fire retardant treatment, the fire retardant-treated wood products may be air- or kiln-dried for a period to reduce its moisture content to be less than 30%, or preferred to be less than 20%. The dried wood composite products are then coated with an XPVAc adhesive as a protective coating. In general, the curing of crosslinking polyvinyl acetate is driven by a loss of moisture in the emulsion and/or when the moisture is dried out. The XPVAc coating can be quickly cured at room temperature. In addition, the curing process of XPVAc can be also accelerated with steam heating, ceramic heating, IR heating, and other suitable heating methods.

Crosslinking polyvinyl acetate has been used as an adhe-sive for the wood industry. In the invention, the XPVAc adhesives are the first time introduced as coating for a fire retardant-treated wood product. For the invention, XPVAc has two functions: It is not only a wood adhesive material, but it also a surface coating for sealing and protecting the fire retardant-treated wood product. As a coating material, XPVAc not only has excellent adhesion with wood, but it also provides excellent water and UV light resistances to the fire retardant-treated wood product.

As mentioned in the prior art of US 20160115337 by Lu, four fundamental principles have been established to improve water resistance and exterior service life of the untreated wood and wood composite products by using a durable adherent coating like XPVAc. These principles are recited herein as follows: "When an adhesive is used as an adherent coating for a structural material, its functions have totally changed: 1) although its one adherent phase bonds to the substrate (which is necessary for a coating), the resin must form a free and continuous film on a substrate like wood with the other adherent phase without bonding, 2) this film only seals the exterior surface of the substrate, 3) this film must be exposed to the natural atmosphere through its nonbonding phase to work as a protective layer for the substrate, and 4) unlike an adhesive, this adherent coating does not act as a stress transfer between/among the adher-ends or the substrate elements". Of course, they also apply to a fire retardant-treated wood product. Firstly, the XPVAc coating not only tightly bonds to wood to form an exterior protective film for the fire retardant-treat wood product, but it also blocks the internal path of water and moisture through the surface porosities of wood and effectively limits their action with the natural atmosphere. Secondly, the durable XPVAc coating can bond and chelate with the unfixed active fire retardant compounds or complexes at the surface layers to keep them in wood and reduces their leaching out into the natural environment, and thus, resulting in a durable and water- and leaching-resistant network system on wood surfaces. Accordingly, the new coating system effectively improves the integrity of leaching and water resistances, durability, and service life for fire retardant-treated wood products.

As disclosed by the aforementioned prior art, the waterproofing composition of XPVAc is normally comprised of a polyvinyl acetate adhesive, a catalyst, a crosslinking agent, a colorant, a surfactant, and the like. The above prior art has also described in detail the ingredients or components of the XPVAc coating.

For the invention, the catalyst of XPVAc may further include: 1) metal ion compounds, including chromium nitrate, aluminum nitrate, aluminum chloride, iron trichloride, antimony trichloride, zirconium nitrate, potassium dichromate, chromic perchlorate, calcium chloride, sodium persulfate, potassium persulfate, bismuth oxychloride, vanadium oxychloride, zirconium oxychloride, etc., 2) nonmetallic chemicals, including ammonium persulfate, hydrogen peroxide, oxalic acid, tertbutyl persulfate, etc., and 3) the combination of these compounds or chemicals. These are just examples. Other catalysts are contemplated.

In some embodiments, an internal crosslinking agent may be used for XPVAc, including acrylic acid (AA), acrylonitrile (AN), butyl acrylate (BA), glyoxal, dialdehyde glyoxal, glutaraldehyde, hexakis(methoxymethyl)melamine (HMMM), isopropylene alcohol, methyl methacrylate (MMA), N-isobutylmethylol acrylamide (NIBMA), N-methylol acrylamide (NMA), natural rubber latex, vinyl esters of versatic acids such as Veo Va 9 and Veo Va 10, and the like. These are just examples.

In some embodiments, other suitable crosslinking agents may be a mixture of vinyl acetate (VAc) with the above internal crosslinking agents to form a monomer such as VAc/BA, VAc/NIBMA, VAc/NMA, VAc/AA/AN, and the like. These are just examples.

In some other embodiments, some adhesives may be used as an external crosslinking agent for XPVAc, including aliphatic polyester-phenol formaldehyde (APPF), EPI, epoxy, furfuryl alcohol-modified urea formaldehyde (FAUF), MF, MUF, PF, polyester, pMDI, polyisocyanate, UF, and the like. These are just examples.

In at least some embodiments, a colorant or pigment may also be added to XPVAc coating, accounting for about 0.05% to about 4% or about 0.05% to about 2% or so of the XPVAc coating by weight. The popular colorants used for XPVAc may be carbon black and titanium dioxide. Other colors suitable for XPVAc may include grey, blue, brown, red, yellow, green and the like. Of course, no pigment in the XPVAc formula can be allowable. These are just examples.

In at least some other embodiments, other additives for XPVAc may be included. For example, a mildewcide, fungicide, and/or insecticide such as 3-iodo-2 propynyl butyl carbamate, alky dimethyl benzyl ammonium chloride, ammoniacal zinc oxide, copper naphthenate, deltamethrin, zinc chloride, zinc oxide or the like may be included, which accounts for about 0.2% to 2% or about 1% to about 4% of the XPVAc coating by weight.

For the invention, XPVAc may be a two-part adhesive, in which the polyvinyl acetate emulsion is the main part, while the other part is the catalyst. XPVAc can also be a one-part adhesive, in which the catalyst is already premixed in the adhesive. However, the former may provide better wet strength and have a longer shelf life than the latter.

On the top or the bottom surface or both of a fire retardant-treated wood product, each coating layer of XPVAc as a protective coating should be about 0.010 lbs. to about 0.10 lbs., or about 0.020 lbs. to about 0.040 lbs. or about 0.050 lbs. to about 0.070 lbs. per square foot in coating amount. It may be about 0.002 inches to about 0.020 inches, about 0.005 inches to about 0.010 inches, or about 0.012 inches to about 0.017 inches in wet thickness. After being cured, XPVAc has a dry thickness range between about 0.001 inch and about 0.010 inch, or about 0.003 inch to about 0.005 inch, or about 0.007 inch to about 0.008 inch.

Since the most porosity at the surface layers of a fire retardant-treated wood product has been filled by the fire retardant, less XPVAc coating may be needed to seal the surface layers of wood, compared with a wood product without a fire retardant treatment. For the invention, the solid content of an XPVAc adhesive should be greater than 20% by weight or preferably in the range between about 30% to about 60%.

Before being treated with a fire retardant, plywood has already undergone multiple cycles of wetting and heating, including log-bathing, veneer drying, glue coating, hot pressing, and the like during manufacture. In addition, most veneer materials have a back cracking defect caused by the cutting knife of a rotary lathe machine during peeling veneer from wood logs. The re-wetting and re-drying process after applying a fire retardant to wood may make the defect so bad that a number of cracks or splits are developed on plywood during and after the treatment. In order to provide durable protection for the fire retardant-treated plywood, it is recommended that two basecoats of XPVAc are needed on the fire retardant-treated plywood before applying the exterior layers of acrylic, alkyd, epoxy, polyester, polyurethane, vinyl ester, or the like.

For the invention, the application of an XPVAc-protected and fire retardant-treated wood product is strongly related to the bonding performance and water resistance of the XPVAc protective coating. When the fire retardant-treated wood product is used as a building material, especially when it is protected under a building structure, the XPVAc protective coating would be between about 175 psi to about 325 psi in Fruehauf wet shear strength. That is, XPVAc can be a Type II adhesive and has low crosslinking efficiency in the cured adhesive. When it is used in an indoor and high humidity or frequently wet condition or under a semi-outdoor environment in which a wood material is partially under shielding or protection, the XPVAc coating is required to be at least 325 psi in Fruehauf wet shear strength. Alternatively, the XPVAc coating can be coated with multilayers of a wood coating such as acrylic, alkyd, epoxy, lacquer, polyester, polyurethane, vinyl ester, polyester, and the like, which may contain nanoparticle dispersions including nano-titanium oxide, nano-boric acid, nano-zinc oxide, etc. The lacquer coating may include nitrocellulose, acrylic, or other polymers. It is either one-part or two-part in formula, while the latter is cured fast and also has improved coating properties compared with the former. As a primer, XPVAc can be one or two coating layers if needed. Alternatively, only one layer of XPVAc can be applied on a fire retardant-treated wood product which is used inside a building or under a shielded structure. However, XPVAc must have a minimum Fruehauf wet shear strength of 525 psi when it is used as a top or exterior coat of the fire retardant-treated wood product and exposed outdoors. Especially for both semi-outdoor and outdoor applications, XPVAc needs to be a Type I adhesive and is preferred to have high crosslinking efficiency after being cured. The aforementioned Fruehauf wet shear strength data are derived from Table 1 in US 20160115337.

The measuring procedure and determination for the Fruehauf wet shear strength of an adhesive are also referenced to this document.

For fire retardant-treated wood products, a fire retardant may be fixed by wood constituents through reacting with 1) cellulose and hemicellulose, 2) lignin, and 3) other non-cellulosic constituents such as tannin, resin acid, and proteins and through 4) physical adsorption of the active fire retardant ingredients by wood constituents. The first three groups are mainly caused by chemical fixation, while the last one results in the physical fixation of a fire retardant in wood.

For chemical fixation, the active ingredients or compounds of a fire retardant can be fixed by chemical reaction with wood in compound middle lamella [including middle lamella (ML) and primary wall (P)], secondary wall (S) such as S1, S2, and S3 layers, and cell corners. On the other hand, physical fixation of a fire retardant mainly results from physical adsorption by wood. In this way, the fire retardant solution is firstly absorbed by wood. The fire retardant is then precipitated in the cavity parts of wood when water or its carrier is removed. Hence, the physically fixed fire retardants in wood are more easily removed from wood by water than the chemically fixed ones.

A fire retardant may mostly exist in the outer layers of wood after the impregnation treatment (i.e., a pressure treatment) or by surface coating. Generally, the fire retardant retention of a fire retardant-treated product by pressure impregnation is gradually decreased from the outer layers of wood to the inner parts. A large amount of the fire retardant in a fire retardant-treated wood product may be mechanically fixed in the porosity parts of wood such as the lumen parts of vessel elements and fiber tracheids, but it can even penetrate into cell walls. There is also chemical fixation in wood by some fire retardants, but sometimes the physical fixation may be dominant. Hence, the unfixed and fixed fire retardant compounds or complexes may coexist in wood.

There is a tendency to lose the free and unfixed fire retardant ingredients from wood during service. Even some fire retardant chemicals fixed at or coated on the surface layers of the fire retardant-treated wood products may be gradually leached out. Obviously, the fire retardant-treated wood products would lose more fire retardant ingredients at the surface layers of wood and the layers close to the surface than the center part during service.

Generally, zinc, magnesium, aluminum, boron, silicon, phosphorus, sulfur, iodine, nitrogen or other elements in a fire retardant may act as a center atom to form two or multiple bonds with the acetate groups ($-OOCCH_3$ or $-O_2CCH_3$) and the hydroxyl groups ($-OH$) of XPVAc adhesive or coating, thus resulting in a chelation or coordination structure. The resultant chelating structure helps fix the free fire retardants in wood. For example, XPVAc is normally a very good chelant to most of the boron compounds, while it can also chelate with zinc-, magnesium-, and aluminum-based fire retardants and the titanium dioxide pigment.

The metal ions or elements in the aforementioned catalysts of XPVAc may chelate with the acetate and hydroxyl groups of XPVAc and some ammonium- and amine-based fire retardants. Moreover, the above boron- and metal-based fire retardants and the titanium dioxide pigment may also form a chelating structure with the hydroxyl groups of lignocelluloses, thus resulting in a chelating complex system for the XPVAc-protected and fire retardant-treated wood materials.

By forming a chelating or coordinate structure with the most active elements of a fire retardant, XPVAc may effectively fix the free or unfixed fire retardant ingredients or compounds at the surface layers and maintain them in wood. Moreover, the unfixed fire retardant ingredients or compounds existing in the internal channels of wood can be kept in wood due to that the XPVAc coating film seals the surface layers of wood by blocking the porosity passages in wood to the natural environment.

For the invention, the chemical fire retardant composition consists of a fire retardant, an XPVAc adhesive, and a regular wood coating like acrylic, alkyd, epoxy, polyurethane, vinyl ester, or the like. The fire retardant-treated wood product may be manufactured through the following steps: Firstly, a wood member is treated with an aqueous or solid fire retardant to form a fire retardant layer and then dried. Secondly, the treated wood product is coated with the XPVAc adhesive on wood over the fire retardant layer and dried or cured. Finally, an additional coating layer of XPVAc or a regular wood coating like acrylic, alkyd, epoxy, polyurethane or silicone coatings further covers these first two coating layers and is then dried or cured. Thus, the wood product treated with the above chemical fire retardant composition has better water and leaching resistances and a longer service life.

Based on its chemical composition, a silicone coating suitable for wood materials may include silicone, chromic acid silicone, acrylic silicone, silicone-urethane and others. A UV curable coating can be also used as a wood coating. It is usually made from acrylated oligomers, including acrylic esters of epoxies, polyethers, polyesters, polyurethanes, etc. A UV curable coating works well indoors, but it is not very durable for outdoor applications.

For the invention, the chemical fire retardant composition for a fire retardant-treated wood product includes applying a fire retardant to wood as the first coating layer via the following feasible approaches:

1) In some embodiments, a wood material can be dipped in a solution of about 2% to about 10% boric acid. The treated wood is then air- or kiln-dried.

2) Alternatively, a wood material is dipped in an aqueous solution of about 2% to about 10% DOT. The treated wood is air- or kiln-dried.

3) In some embodiments, a wood material is dipped or pressure-impregnated with a 2% to 10% solution of the mixture of boric acid and aluminum trihydroxide. The mixing ratio of aluminum trihydroxide versus boric acid is about 1:1 to about 1:3. The treated wood is then air- or kiln-dried.

4) In at least some embodiments, a fire retardant chemical can be a water solution of ammonium sulfate, monoammonium phosphate, diammonium phosphate, ethylene diamine tetraacetic acid (EDTA), sodium hydrogen carbonate, etc. The prepared solution is then impregnated into a wood- or cellulose-based material. The treated wood is then air- or kiln-dried.

5) In some cases, some metal oxide-based fire retardants such as aluminum trihydroxide, which are hard to be fixed in wood, can be mixed with a wood adhesive including UF, MF, MUF, PF, and the like to form a fire retardant coating. This coating is further mixed with the wood composition elements of particles, strands, chips, flakes, fibers, etc. The coated composition elements are formed into a wood composite assembly, which is heated in a hot press and finally formed into a wood composite material (e.g., OSB, flakeboards, particleboards, MDF, etc.).

6) In at least some cases, a fire retardant may be the mixture of a phenol formaldehyde adhesive resin and an alkaline metal silicate such as water glass. The mixture is brushed on a wood material and then cured by heat or under room conditions.

7) In some embodiments, a fire retardant chemical can be a dry mixture of monoammonium phosphate, diammonium phosphate, and boric acid. The mixture is dissolved in water to form an aqueous solution and is substantially neutral in pH value. A wood material is then coated or pressure-treated with the fire retardant solution. The treated wood member is further dried out by air or by heat. One of the advantages of this fire retardant-treated wood material is the low corrosiveness to metals.

8) In some embodiments, a fire retardant chemical in an aqueous solution may be a mixture of monoammonium phosphate, diammonium phosphate, and optionally a corrosive inhibitor like SHER-GARD which is manufactured by the Sherwin-Williams Company. The solution is substantially neutral or slightly basic in pH value. This fire retardant can be brushed on or pressure-impregnated into a wood material.

9) In at least some embodiments, a fire retardant may be an intumescent coating formula consisting of heat expandable graphite, calcium carbonate, and aluminum oxide. It is blended with a PF, MF, MUF, UF/polyvinyl acetate adhesive, or the like. The resultant coating is applied on a wood or wood composite material and then heated at about 212 F degrees (i.e., 100 C degrees) and cured.

10) In some cases, a fire retardant may be two-part chemical compounds. For instance, an aqueous sodium silicate is mixed with zinc oxide, zinc stearate and water-ground mica as the first composition part (or the Part A), while a solution of hydroxyethyl cellulose, magnesium oxide, magnesium carbonate, zinc carbonate, and vinylidene chloride/butadiene latex is prepared as the second composition part (or the Part B). Before being applied on wood, both parts are blended together with a mixing ratio of 1:1. The blend can be diluted with water to form an aqueous or colloidal-dispersed fire retardant. It is then applied onto or into wood through spraying, dipping, brushing, pressure impregnation, etc. The fire retardant is cured at room temperature.

11) In at least some cases, a fire retardant may be a mixture of guanylurea phosphate and boric acid. A wood member is treated with the resultant fire retardant solution through dipping, soaking, brushing, or pressure impregnation. These are just examples.

After the above procedures or treatments, the resultant fire retardant-treated wood material is dried by air or by heat to reduce the moisture content of wood to be less than 30%, preferably, less than 20%. An XPVAc adhesive is then applied on the fire retardant-treated wood as the second coat and cured for better water and leaching resistances and a longer service life. Alternatively, a second coating layer of XPVAc is coated over the cured XPVAc primer and then further cured by air or by heat. Finally, the fire retardant-treated wood materials can be further coated with a third or multiple layers of acrylic, alkyd, epoxy, lacquer, polyester, polyurethane, silicone coatings, or other wood coatings over the XPVAc primer.

For the invention, the XPVAc-protected and fire retardant-treated wood products can be used for a number of indoor or outdoor applications, including decks, sub-floors, picnic tables, benches, trash bins, fences, flower stands, basket holders, sidings, soffits, porch and patio ceilings, wood tiles for roof, doors, windows, roof boards, garage ceilings and walls, sheathing boards, shutters and boxes for windows, walls and decks for RV, walls and sidings for barns, cabins and sheds, marine posts and rails, marine decking, utility poles, piles, posts, ties, bird houses, outdoor mailboxes, outdoor frames, and other outdoor decorations and furniture, anti-acoustic boards for highways, rafts, dock frame and flooring, sign/ad boards, truck trailer walls, truss beams, wood bridges, wooden boats or ships, wood structures in boat building, etc.

EXAMPLES

The invention may be further clarified by reference to the following examples, which serve to exemplify some of the preferred embodiments or situations, but not to limit the invention in any way.

Example 1

A fire retardant of aluminum trihydroxide powder is mixed with wood particles before the forming process for manufacture of particleboards. At the same time, the particles are sprayed with a PF adhesive. The mixture of the resin-coated wood particles and aluminum trihydroxide are assembled through a panel former into a one to four inch thick panel mat during the forming process. The assembly is then pressed in a steam or radio frequency hot press. The top and bottom surfaces of the resultant particleboards may be sanded by a roller sander. It is preferred that most of the aluminum trihydroxide powder is applied at the surface layers which are located at or close to the top and bottom surfaces of the particleboards. The concentration of aluminum trihydroxide is between about 0.05 lbs. to about 1.0 lbs. per cubic foot of particleboards.

An XPVAc adhesive is applied on both of the top and bottom surfaces of the above particleboards. The coating layers of XPVAc are further cured by air or by heat. The coating amount of XPVAc is between about 0.011 lbs. to about 0.055 lbs. per square foot. The coating layers are about 0.005 inches to about 0.020 inches (or 5 mils to 20 mils) in wet thickness. The above fire retardant-treated particleboards can be directly used indoors as a building material.

Alternatively, a wood coating like acrylic, alkyd, epoxy, silicone coatings, and polyurethane can be sprayed or roller-coated over the cured XPVAc layer and further dried by air or by heat. The resultant particleboards with the above fire retardant composition can be used outdoors.

Example 2

The wood composition elements in Example 1 may be chips, fibers, flakes, strands, sawdust, and the like.

Example 3

The particleboards in Example 1 can be a flake-like wood material, including OSB, flakeboards, chipboards, etc. It can also be a fiber-based wood material, including hardboards, MDF, dry-process fiberboards, paper products, cardboards, cellulose, sisal, kenaf, hemp, jute, flax, or other nature fibers-based composites, etc.

Example 4

The fire retardant of aluminum trihydroxide in Example 1 can be substituted with barium metaborate, ammonium fluoroborate, zinc borate, magnesium oxide, titanium oxide, or the combination thereof.

Example 5

The wood adhesive in Example 1 can be substituted with UF, MF, MUF, RF, RPF, EPI, pMDI, soy protein-based glue, etc.

Example 6

The fire retardant of DOT is mixed well with a PF adhesive. The concentration of DOT is between about 1% to about 10% of PF adhesive by weight.

A piece of 4 ft. by 8 ft. three-layer or multilayer plywood is coated on the top and bottom surfaces with the above fire retardant formula. The fire retardant coating is cured by air at room temperature. Or, the coated plywood can be cured under a hot press after the coating forms a dry film by heat.

An XPVAc coating is further applied on the top or bottom surface, or both of the above plywood. The coating layers of XPVAc are further cured by air or by heat. The coating amount of XPVAc is between about 0.011 lbs. to about 0.055 lbs. per square foot. The coating layers are about 0.005 inches to about 0.020 inches, about 0.008 inches to about 0.012 inches, or about 0.015 inches to about 0.017 inches in wet thickness. The above fire retardant-treated plywood can be directly used indoors as a building material.

Alternatively, a wood coating like acrylic, alkyd, epoxy, silicone coatings, and polyurethane can be sprayed or roller-coated over the cured XPVAc layer and further dried by air or by heat. The resultant fire retardant-treated plywood panels can be used outdoors.

Example 7

The PF adhesive in Example 6 can be replaced with MF, RF, PRF, MUF, UF, pMDI, polyurethane, soy protein-based glue, etc.

Example 8

The fire retardant of DOT in Example 6 can be substituted with sodium borax, barium metaborate, ammonium fluoroborate, sodium silicate, etc., or the combination thereof.

Example 9

The wood substrate in Example 6 can be lumber, logs, LVL, CLT, OSB, particleboards, fiberboards, LSL, PSL, OSL, gypsum particleboards, and other wood composites.

Example 10

A piece of 2 inch thick by 4 inch wide by 8 ft. long fire retardant-treated pine lumber was purchased commercially. The fire retardant was a phospho-ammonium-boron complex and its retention was about 5% of the fire retardant-treated pine lumber by weight.

The above treated lumber was first cut into four pieces of about nine-inch long sections. One was used as a control, while the other three were coated with one layer of XPVAc coating in an ambient condition. The coating amount of XPVAc was about 0.030 lbs./ft². The XPVAc-coated specimens were completely cured overnight. Two of them were further sealed with acrylic and alkyd, respectively, and dried out at room temperature. All four uncoated and coated specimens were stored indoors for one week prior to a leaching test. Measured with a moisture content (MC) meter, the MC of all specimens was about 8% on average. Each specimen was weighed before the leaching test.

All the above test specimens were submerged one inch below the water level in a plastic bucket. During leaching, each specimen was weighed and recorded. At the intervals of the quarter, the first, the third, the fifth, and the seventh days, respectively, the old leaching solution was drained away. All specimens were rinsed and submerged again in fresh water at the same water level. On the seventh day, all specimens were removed from the bucket. The surface water was wiped off with a dry towel. All the specimens were then dried in an oven at 140 F degrees. They were removed from the oven when their MC was back to the original value before leaching. All specimens were weighed again and recorded. For the invention, a fire retardant loss rate is equal to the retention difference of a fire retardant in wood before and after the leaching divided by its retention before leaching. The leaching performance of these four specimens is listed in the following table:

TABLE ONE

Leaching results of the fire retardant-treated lumber specimens

| Coated specimen | Fire retardant loss, % |
|---|---|
| Control (without XPVAc) | 11.7 |
| Only one coat of XPVAc | 0.0 |
| 1$^{st}$ coat: XPVAc/2$^{nd}$ coat: Acrylic | 0.0 |
| 1$^{st}$ coat: XPVAc/2$^{nd}$ coat: Alkyd | 0.0 |

By observation, the pink color of the control was almost gone after one-week leaching. Moreover, it had many cracks on all wood faces after being dried back to the original MC. However, all XPVAc-coated specimens were intact and had no cracks or color fading.

Example 11

The rest of the fire retardant-treated pine lumber mentioned in Example 10 was further cut into four pieces of about one foot-long sections. One was used as a control, while the others were coated with one layer of XPVAc coating at room temperature. The coating amount of XPVAc was about 0.030 lbs./ft². The second was coated only with one layer of XPVAc, while the third and fourth were further recoated with one layer of an acrylic paint over the completely cured XPVAc coating: one was brown in color, whereas the other was tan. All the above coated and uncoated pine specimens were stored at room temperature for three days prior to outdoor exposure.

All coated pine lumber specimens were fastened with screws on a 4 ft. by 4 ft. wood pallet. The pallet stood above the ground with supporting legs and was vertically tilted about 10° to 15° in order to help drain rain or condensed vapor or moisture away the coating. During the test, the top coating layer of each specimen faced up in an outside Minnesota environment.

After one-month exposure, the control started fading in color. After three month exposure, the pink color on the top face and end of the control was completely gone and it started cracking at the top end. However, other specimens were intact and did not fade in color. After about nine-month exposure, a number of cracking occurred on the top face of the control. There were also some cracks on its end and edge faces. However, other specimens had no cracks and were intact. After one-year exposure, the XPVAc coated brown and tan fire retardant-treated wood specimens had no cracks and were intact.

Example 12

After about nine-month outdoor exposure, the uncoated fire retardant-treated pine lumber and the fire retardant-treated pine lumber exteriorly coated with one layer of XPVAc in Example 11 were brought indoors. All dirt and dust on these two outdoor-exposed lumber specimens were cleaned up. By observation, the uncoated lumber had many cracks on the top end and surface and both sides after the outdoor exposure, and the pink color of the fire retardant coating was gone. However, the XPVAc-coated lumber was intact without any cracks or color fading.

Another one-foot long specimen from the remainder of the unexposed 2 inch thick by 4 inch wide by 8 ft. long fire retardant-treated pine lumber in Example 10 was used as received. In addition, another one-foot long specimen was cut from a plain and 4 inch wide by 2 inch thick pine lumber and used as a control for this experiment. All the above four pine lumber specimens were placed side by side on a steel rail before a burning test. The rail was horizontally tilted about 10 to about 15 degrees.

A flame burner was ignited after turning on the gas valve. The gas valve was adjusted until a smooth and blue blaze appeared. Each specimen was burnt, respectively, at the center and one inch away from its bottom end. The burning period for each specimen lasted for thirty seconds. The fire on wood was extinguished by turning off the burner.

After the burning test, the non-protected but fire retardant-treated pine lumber after outdoor exposure had almost the same fire spreading length and shape as the plain pine lumber which had no fire retardant treatment and no outdoor exposure, and had almost lost its fire retarding function. However, the XPVAc-coated and outdoors-exposed pine lumber which was treated with the phospho-ammonium-boron fire retardant had the same fire spreading length and shape as the above unexposed and fire retardant-treated pine lumber, and maintained well its fire retarding performance even after about nine-month outdoor exposure.

According to the testing results of Examples 10 to 12, the XPVAc coating can provide excellent water and leaching resistances and improved durability to fire retardant-treated wood materials even in outdoor conditions.

The above fire retardant-treated wood products with XPVAc coating protection are herein described in certain embodiments, situations or cases which are used only for a presentation. The descriptions may be subject to changes, modifications, and substitutions without falling out of the spirit of the invention.

I claim:

1. A chemical fire or flame retardant composition for a wood member or product that is at least one of a solid wood product and a wood composite product comprising:
   a fire retardant;
   said composition further including a crosslinking polyvinyl acetate protective coating which is applied to exteriorly bond and seal at least a part of exterior surfaces of the wood member; however, the crosslinking polyvinyl acetate protective coating is not bonded with any wood material-based composition elements including chips, fibers, flakes, lumber, particles, strands, sawdust, veneer and wood flour for manufacture of said wood composite; wherein said protective coating forms into a protective film on the exterior surfaces of said member, such that said protective coating is on the exterior surfaces of said member when cured; said protective coating chelating with the fire retardant;
   wherein the crosslinking polyvinyl acetate protective coating at least includes a polyvinyl acetate-based adhesive resin, a crosslinking agent, and a catalyst before being cured;
   wherein said protective coating has a minimum Fruehauf wet shear strength of 175 psi when applied to the wood member and cured; and
   wherein said composition improves the water and leaching resistances and durability of said member in an indoor or outdoor condition.

2. The chemical fire retardant composition of claim 1, wherein the fire retardant includes a zinc-, magnesium-, or aluminum-based compound or complex, a boron-, phosphorus-, bromine-, sulfur-, nitrogen-, chlorine-, fluorine-, or silicon-based compound or complex, or the combination thereof.

3. The chemical fire retardant composition of claim 1 having a minimum fire retardant retention of 0.005 lbs. per cubic foot for a fire retardant-treated wood member.

4. The chemical fire retardant composition of claim 1, wherein said crosslinking polyvinyl acetate protective coating has a solid content of at least 20% by weight.

5. The chemical fire retardant composition of claim 1, wherein said crosslinking polyvinyl acetate protective coating has a minimum Fruehauf wet shear strength of 525 psi when applied and cured as a top coating layer on the exterior surfaces of said wood member and exposed outdoors.

6. The chemical fire retardant composition of claim 1, wherein the crosslinking polyvinyl acetate protective coating is coated on the exterior surfaces of said wood member when the moisture content of said wood member is less than 30%.

7. The chemical fire retardant composition of claim 1, wherein a second coating layer of crosslinking polyvinyl acetate is applied and cured over a first coating layer of the cured crosslinking polyvinyl acetate on said member or product.

8. The chemical fire retardant composition of claim 1, wherein a second layer or multiple layers of a wood coating selected from the group consisting of acrylic, alkyd, epoxy, lacquer, polyester, polyurethane, silicone coatings, and vinyl ester is applied as a top coat over a first coating layer of the dried or cured wood coating on said member or product.

9. The chemical fire retardant composition of claim 1, wherein said protective coating includes a first adherent phase which seals and bonds with at least a part of the exterior surfaces of the wood member and a second adherent phase which is cured and does not contact or bond to the exterior surfaces of said member.

10. The chemical fire retardant composition of claim 1, wherein said protective coating does not function as an adhesive to transfer stress between or among said wood composition elements when said member is subject to an external force or load.

11. The chemical fire retardant composition of claim 1, wherein said protective coating forms a free and continuous film on at least a part of an exterior surface of said member.

* * * * *